United States Patent Office

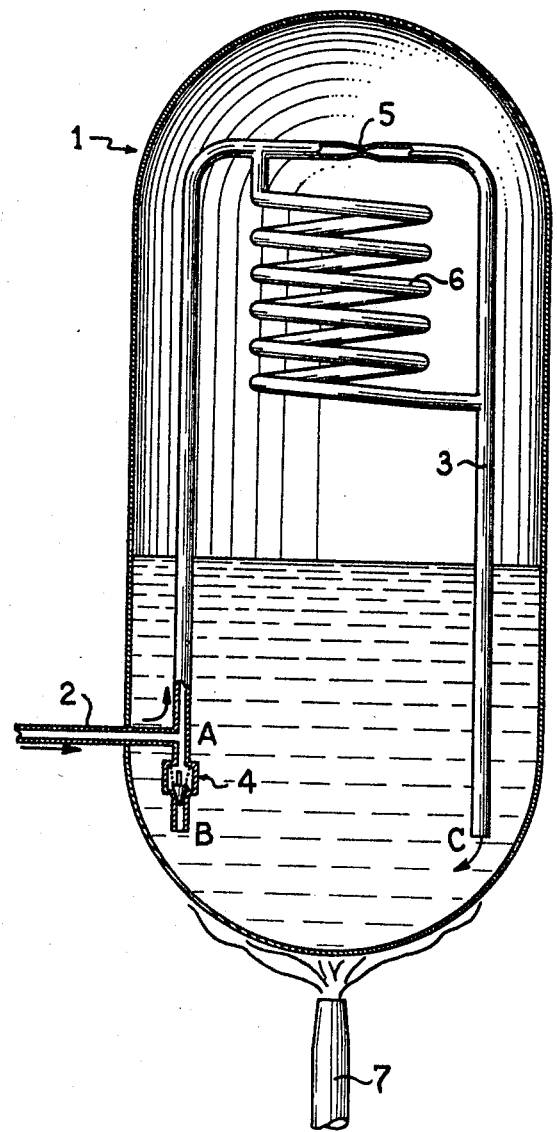

3,448,797
Patented June 10, 1969

3,448,797
PRESSURIZER
Jacques Chevallier, Chaville, and Jean Havard, Paris, France, assignors to Commissariat a l'Energie Atomique, Paris, France, a French body corporate
Filed Aug. 9, 1966, Ser. No. 571,222
Claims priority, application France, Sept. 30, 1965, 33,216
Int. Cl. F28f 7/00; F28d 21/00
U.S. Cl. 165—107                                 4 Claims

ABSTRACT OF THE DISCLOSURE

Pressurizer comprising a chamber containing steam and water and piping which puts solely the part of the chamber containing water in communication with the primary circuit of a power heat installation and includes a heat exchanger located in the steam in the chamber so as to cool the steam and oppose pressure increase resulting from the entry in the pressurizer of expansion water from the primary circuit.

---

The invention relates to a power heat installation of the type having primary and secondary circuits in which a fluid, such as water, flows through the primary circuit, which is closed, so as to cool the centre of an atomic reactor or any other source of heat, and thereafter gives up in an exchanger the heat thus received to a fluid flowing in a secondary circuit thereby furnishing for example steam for driving a turbine.

An installation of this type is characteristic of atomic power stations since the fluid of the primary circuit which passes through a radioactive medium becomes itself radioactive. For obvious reasons of security, this fluid must only perform the function of an energy conveyor and transfer this energy to the fluid of a secondary circuit which, as it does not pass through the radioactive centre, of the breeder reactor, is not liable to be contaminated.

The primary circuit is therefor a closed circuit in which the fluid is successively heated and cooled.

When the fluid employed is water, the latter is maintained constantly at a given pressure so as to preclude the boiling thereof. However, the rate of operation of such an installation is not uniform and the power demanded is liable to vary considerably. If the power is for example reduced, the water of the primary circuit heats up and therefore expands since it receives more heat than it gives off. In order to permit this expansion a pressurizer or pressure control device is associated with the primary circuit and acts as an expansion vessel for the water expelled from the primary circuit. In this pressurizer the water is in equilibrium with its steam at a temperature which is rather distinctly higher than the mean temperature of the circuit and maintained constant by appropriate heating by an automatic regulation device.

When the water of the circuit enters the pressurizer it urges back the hotter water already contained in the pressurizer by compressing the steam of the latter. A relatively high increase in pressure results.

Various means have been contemplated for eliminating this pressure increase, for example an automatic shower system which injects cold water into the steam when its pressure exceeds a given value, but these systems are complicated and unreliable.

The object of the present invention is to remedy these drawbacks.

The invention provides an improved method of regulating the pressure prevailing in a pressurizer or pressure control device which comprises employed at least a part of the colder water which enters the pressurizer for cooling the steam in the pressurizer and reduce the pressure thereof so as to eliminate the pressure rise subsequent to the entry of expansion water in the pressurizer.

Another object of the invention is to provide an improved pressurizer which employs the method according to the invention, wherein the piping connecting the primary circuit to the pressurizer is extended inside the pressurizer and includes an exchanger which is located in the steam phase and in which at least a part of the expansion water circulates and which is adapted to cool said steam.

Further features and advantages of the invention will be apparent from the ensuing description with reference to the accompanying drawing.

The single figure is a diagrammatic view of an embodiment of a pressurizer according to the invention.

In the illustrated embodiment, the pressurizer or pressure control device comprises a closed vessel 1 defining a chamber containing water and steam. A conduit 2 communicates with the lower part of the vessel 1 and connects it to the piping of the primary circuit (not shown) of a heat installation.

This conduit 2 extends into the vessel 1 of the pressurizer in the form of an inverter U-shape pipe 3 which includes a check-valve 4 at the lower end of one of the branches and a constricted passage or throttle 5 in the horizontal part of this U-shape pipe. An exchanger formed by a coiled pipe 6 bypasses the throttle 5. The pipe 3 has two outlet orifices B and C communicating with the pressurizer. A source of heat 7 maintains the water of the pressurizer at a temperature higher than that of the primary circuit and compensates the pressurizer heat losses.

The water supply conduit 2 supplying water to the pressurizer 1 is connected to the pipe 3 at a point A located between the check-valve 4 and the point of connection between the coiled pipe 6 and the pipe 3.

The primary circuit is therefore connected to the pressurizer in the following manner; the water enters by way of the conduit 2 at A and can not flow towards the orifice B since the check-valve 4 prevents this. Consequently, the water flows upwardly and through the coiled pipe 6 and the throttle 5 (connected in parallel) and issues at C in the pressurizer.

The device operates in the following manner:

When less power is demanded of the installation, the water of the primary circuit becomes heated and expands. The expansion water arrives in the pressurizer at point A by way of the conduit 2, it rises in the pipe 3 and, owing to the resistance to flow offered by the constricted passage or throttle 5 a part of the water flows through coiled pipe 6. As the coiled pipe is located in the steam phase in equilibrium with the water already contained in the pressurizer, there is a heat exchange, the steam cools and its pressure drops. Then the thus-heated expansion water enters the pressurizer by way of the orifice C and this causes the water level in the pressurizer to rise without increasing the pressure owing to the function of the coiled pipe.

When the power demand of the heat installation increases, the water of the primary circuit cools and therefore contracts. The hotter water of the pressurizer consequently has a tendency to return to the primary circuit in which the pressure drops. This occurs by way of the orifice B and the check-valve 4 which opens in the direction from B towards A. The pressure of the steam is higher than the pressure prevailing in the primary circuit and urges the water through B and A to the primary circuit. The hot water contained in the pressurizer 1 opposes the pressure drop of the boiling steam and thus greatly reduces the steam pressure variation and consequently the primary circuit pressure variation.

It will be understood that it is necessary to determine in a precise manner the volume of the pressurizer, the diameter of the various conduits, the characteristics of the exchanger and the diameter of the constricted passage so that the exchanger performs its regulating function and compensates in the best possible manner the pressure variations in the presurizer.

The pressurizer according to the invention has in particular the advantage of not requiring outside elements and only employing static means. The result is that the operation is remarkably reliable and efficient and independent, within wide limits, of the rate at which the expansion water enters the pressurizer and of the level of the water in the latter.

Although a specific embodiment of the invention has been described, many modifications and changes may be made therein with departing from the scope of the invention as defined in the appended claims.

Having now described our invention that we claim as new and desire to secure by Letters Patent is:

1. A pressurizer comprising in combination: a closed chamber defining a chamber having having a part for containing steam and a part for containing water and piping for connecting the chamber to the primary water circuit of a power heat installation, said piping extending inside the chamber and solely communicating with the part of the chamber for containing water and including an indirect heat exchanger which is located in said part of the chamber for containing steam and in which at least a part of the expansion water of said water circuit flows and thereby cools said steam.

2. A pressurizer as claimed in claim 1, wherein the exchanger is connected in parallel with a constricted passage in said piping inside the chamber.

3. A pressurizer as claimed in claim 1, wherein said piping has a first portion for connection to said primary circuit and a second portion which has an inverted U-shape one of the branches of which is connected to said first portion whereas the other branch has a lower end which communicates with said part of the chamber for containing water, the upper part of the U-shaped piping being located in said part of the chamber for containing steam.

4. A pressurizer as claimed in claim 3, wherein said piping also communicates, at a point located near the connection between said one of the branches of the U-shape piping and said first portions, with part of the chamber for containing water by way of an orifice provided with a check-valve which is capable of opening in the direction permitting the return of said expansion water to the primary circuit.

References Cited

UNITED STATES PATENTS

| | | | |
|---|---|---|---|
| 3,212,565 | 10/1965 | Esleeck | 165—58 |
| 3,245,463 | 4/1966 | Benedict et al. | 165—105 |
| 3,305,002 | 2/1967 | Leonard et al. | 165—105 X |
| 3,060,110 | 10/1962 | Wainrib | 176—50 X |
| 3,114,414 | 12/1963 | Judd | 122—32X |

FOREIGN PATENTS

| | | |
|---|---|---|
| 692,122 | 8/1964 | Canada. |

ROBERT A. O'LEARY, *Primary Examiner.*

ALBERT W. DAVIS, JR., *Assistant Examiner.*

U.S. Cl. X.R.

122—32; 165—138; 176—51, 65